Aug. 9, 1955
E. B. PATTERSON ET AL
2,714,834
RECORDING DENSITOMETER
Filed March 11, 1954
2 Sheets-Sheet 1
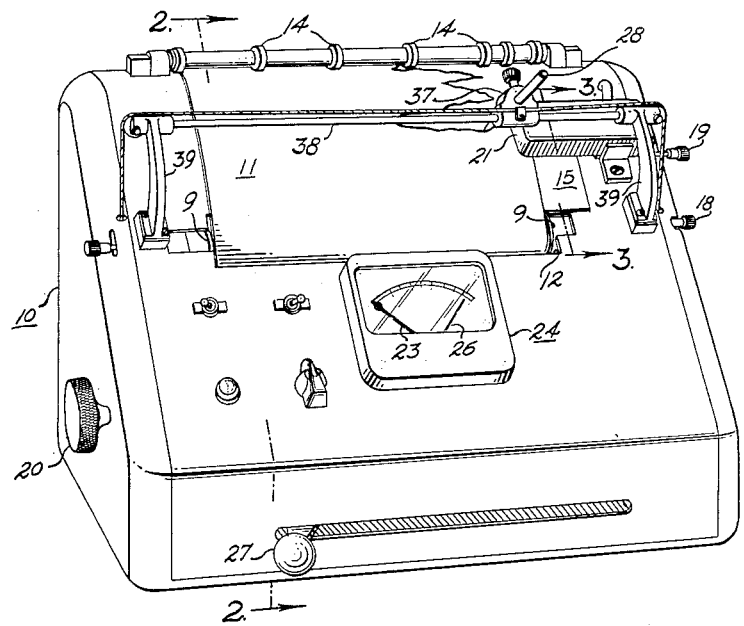
FIG. 1.
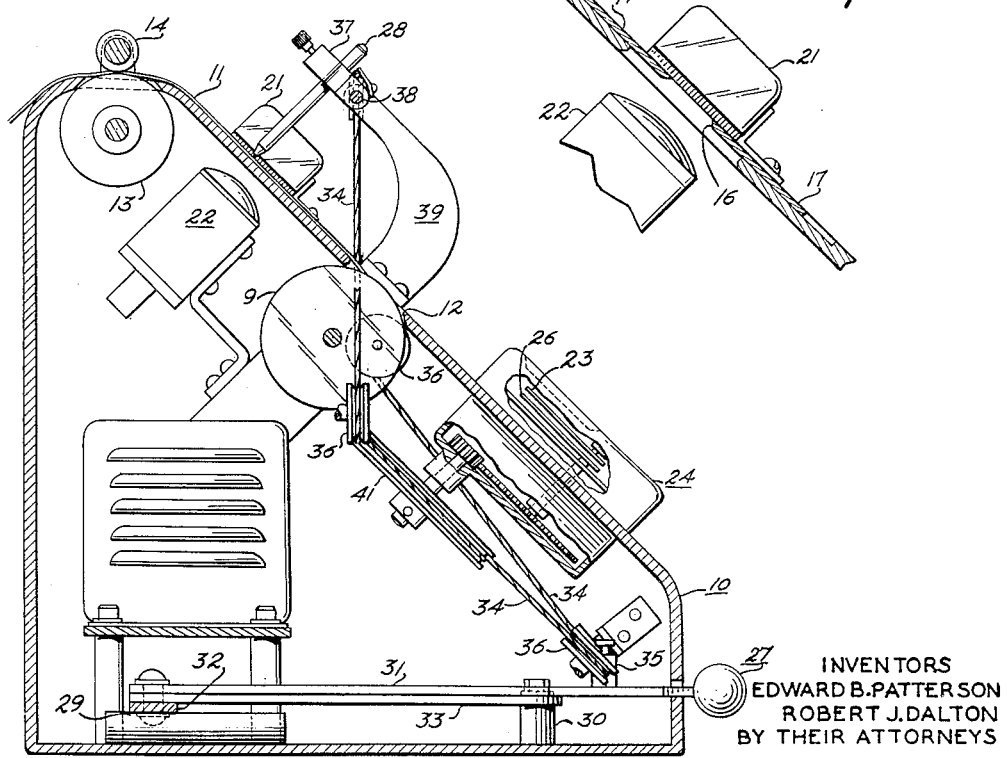
FIG. 2.
FIG. 3.
INVENTORS
EDWARD B. PATTERSON
ROBERT J. DALTON
BY THEIR ATTORNEYS
Howson & Howson Aug. 9, 1955  E. B. PATTERSON ET AL  2,714,834
RECORDING DENSITOMETER
Filed March 11, 1954  2 Sheets-Sheet 2
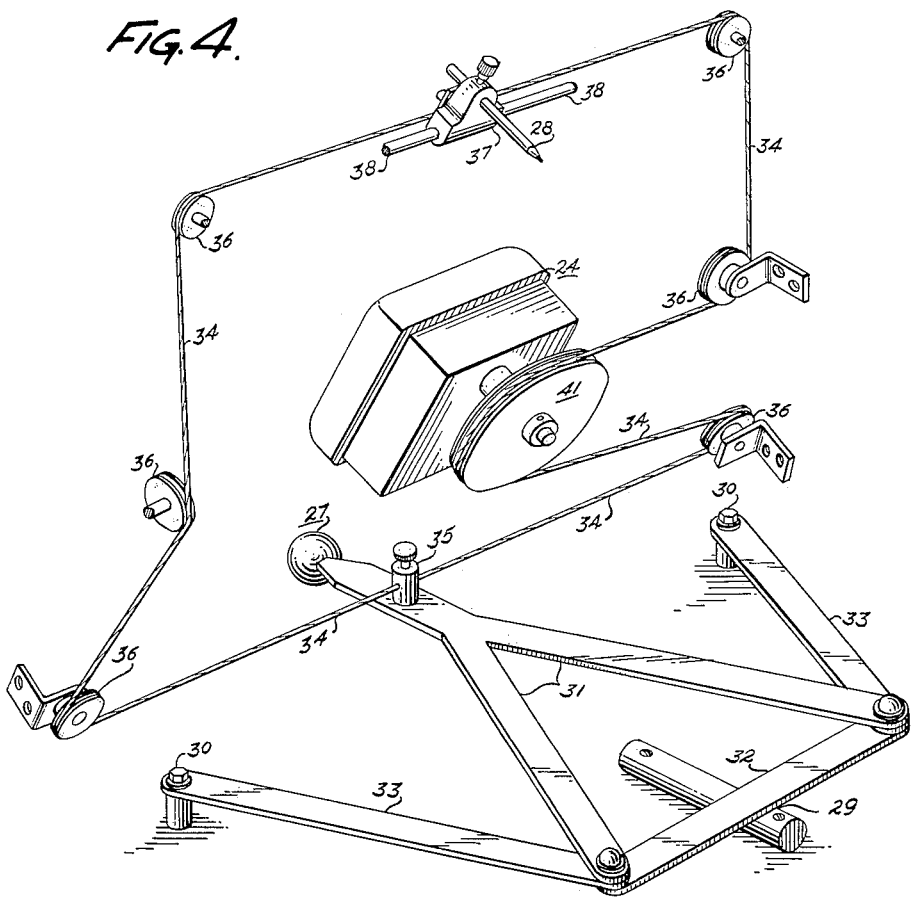
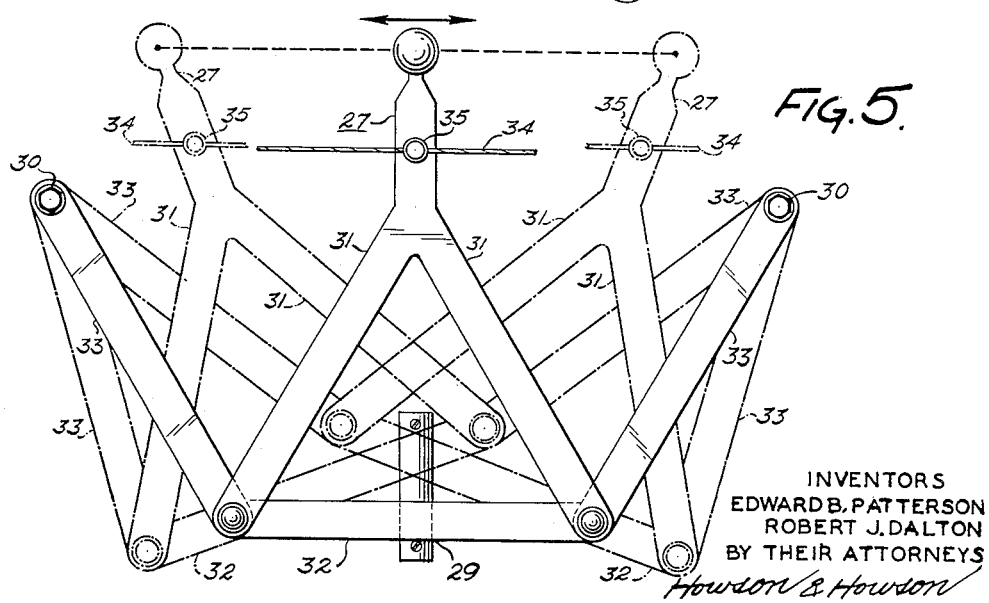
INVENTORS
EDWARD B. PATTERSON
ROBERT J. DALTON
BY THEIR ATTORNEYS
Howson & Howson United States Patent Office 2,714,834
Patented Aug. 9, 1955

2,714,834

RECORDING DENSITOMETER

Edward B. Patterson, Colwick, Merchantville, and Robert J. Dalton, Haddonfield, N. J., assignors to Arthur H. Thomas Company, Philadelphia, Pa., a corporation of Pennsylvania Application March 11, 1954, Serial No. 415,578

3 Claims. (Cl. 88—14)

The present invention relates to physico-chemical apparatus, and more particularly to apparatus for recording relative opacity of materials, for example blood serum constituents, by determining and recording the intensity of light which passes unabsorbed through a translucent carrier strip upon which, or in which, the substances, properly treated, are distributed.

In the testing of blood protein-fractions, for example, the distribution of the fractions is commonly obtained upon a bibulous paper strip. Predictable linear displacement of the individual fractions upon the strip is accomplished by preparatory physico-chemical methods, e. g. application of an electrical potential, which take advantage of the differences in migration rate of the serum constituents. The fractions are distributed as relatively well defined and separate bands, zones or spots in either one or both directions from the point of application of serum to the paper. Substances which, like the blood proteins, do not absorb white light, are treated with a specific dye which is adsorbed by the protein with an intensity of coloration in direct ratio to the concentration of the protein. By scanning the strip to evaluate the relation of the intensity of light adsorption of each individual zone to the total light absorption of the combined zones, the ratio of blood protein constituents is determined.

In tests of the stated type, the test material, for example, properly stained blood protein, affects the translucency of the strip in proportion to its concentration. Thus, the relative concentrations of the material along the strip may be analytically determined by photoelectric means. The standard practice at present consists of passing the sample carrier strip between a controlled light source and a photoelectric cell. A succession of readings is made from a meter associated with the cell, and the readings are plotted on a record sheet. The successive points are then interconnected to provide a line graph representative of the relative translucency of the strip and therefore of the relative concentration of the material.

The present invention contemplates novel apparatus which obviates the necessity for manually plotting the individual meter readings, and enables the operator of the test apparatus to record the meter deflection as a continuous line graph of the readings at the same time as the strip is advanced between the light source and the photoelectric cell. To accomplish this, the test strip is advanced past a photoelectric cell concurrently with the passage of a recording sheet past a transversely movable stylus. The meter indicates the varying translucency of the strip and the operator manipulates a lever to operate a follower member to positions corresponding to the meter readings. Operation of the follower effects transverse movement of the stylus on the recording sheet to accurately reproduce the various meter readings on the recording sheet.

More specifically, the invention contemplates apparatus of this character in which linear movement of the lever effects angular movement of the follower member and linear movement of the stylus in recording the photoelectric output of a light-sensitive cell when scanning sample strips described above.

These and other objects of the present invention are more fully set forth hereinafter with reference to the accompanying drawings, in which:

Fig. 1 is a perspective view of a recording apparatus made in accordance with the present invention;

Fig. 2 is a sectional view taken on line 2—2 of Fig. 1;

Fig. 3 is an enlarged sectional view taken on line 3—3 of Fig. 1;

Fig. 4 is a detached perspective view of the linkage interconnecting the operating lever, the stylus, and the follower member for the meter; and, Fig. 5 is a plan view of the operating lever showing its limit positions in broken lines to illustrate the linear movement from one end of the scale to the other.

In the drawings, the apparatus is shown and described as applied to the testing of sample strips obtained by methods such as are described in the literature of chromatography and electrophoresis. The casing 10 of the apparatus has rotatably mounted therein a roll 9 of recording paper 11. The paper is drawn from the roll 9, through an elongated slot 12 in the casing and over the outer surface of the casing, for example by an advancing roll 13 and guide rollers 14. A knob may be provided, as at 20, to actuate the advancing roll. The test strip of paper 15 containing the sample is secured to one edge of the recording paper 11 and is adapted to pass over a narrow opening or slit 16 disposed in the casing adjacent the path of travel of the recording paper. The slit is defined by a pair of movable walls 17, 17 which may be adjusted to and fro by a suitable adjusting screw 18. A second adjusting screw 19 is provided to regulate the length of the slit 16.

To obtain the relative concentration of the test sample on the strip 15, the translucency of the strip is measured. To this end, a light sensitive photoelectric cell 21 is mounted in spaced-overlying relation to the slit 16 so that the test paper 15 may pass between the cell and the slit. A light source 22 is provided underneath the slit 16 to energize the photoelectric cell in accordance with the intensity of the light that passes through the test paper 15. The degree of energization of the cell 21 is indicated by a needle 23 of a meter 24. The electrical circuit between the cell 21 and the meter 24 is conventional and is not shown herein.

To provide a permanent record of the density of distribution of light-absorbing materials on the strip 15, the recording paper 11 is advanced carrying the paper strip past the slit 16. As the needle 23 is actuated to indicate the translucency of the strip, a second needle 26 is maintained in registry with the needle 23 by manipulation of a lever 27 mounted in the casing. Manipulation of the lever 27 also actuates a stylus 28 which is movable transversely of the paper 11 to record the deflection of the meter 24. Thus, as the strip 15 is advanced, a continuous record of its photo-density is made on the recording paper 11 by the stylus 28. By plotting a line graph of the photo-densities at the various locations along the strip it is possible to analyze the sample.

The linkage for connecting the stylus 28, the pointer 26 and the lever 27 is clearly shown in Figs. 4 and 5. The lever 27 is mounted for straight-line movement, for example by the linkage shown. To this end, the linkage is pivoted to the casing at 30, 30 and is slidably supported thereon as indicated at 29. As shown in Fig. 5, this linkage affords straight-line movement of the lever 27. The lever 27 comprises a Y-shaped member 31 having a cross bar 32 spanning the free extremities of the legs of the member 31. As shown in Figs. 4 and 5, the cross bar 32 rides on the support 29 during back and forth movement of the lever 27. A link 33 is pivoted at one end to each leg of the member 31 at the free extremity thereof and at the other end to the pivot point 28. By this construction, the lever 27 is capable of straight-line displacement within the casing as shown in Fig. 5.

An endless cable 34 is mounted on the lever 27 as indicated at 35. The cable moves with the lever and is threaded over a series of pulleys 36 to impart corresponding transverse movement to the stylus 28 on the paper 11. To this end, it is noted that the stylus is mounted on a carriage 37 secured to the cable 34 and is slidably mounted on a guide rod 38 which is mounted on the casing 10 by brackets 39, 39. The cable 34 also passes around and actuates a pulley 41 mounted on the meter 24 and keyed to the pointer 26 to effect angular movement thereof. Thus, as the lever 27 is displaced in the casing, the stylus 28 is similarly displaced and the pointer 26 is displaced angularly to register with the needle 23.

In operating the apparatus to obtain a plot of the translucency along the strip 15, the strip is secured to the edge of the recording paper 9. The paper is advanced to bring the strip into registry with the slit 16 and the lever 27 is actuated to register the pointer 26 with the needle 23 in the meter 24. The paper and strip are then slowly advanced and at the same time the lever 27 is actuated to maintain registry between the needle and the pointer. Thus, as the strip is advanced, a continuous record of the meter deflection is made on the paper 11. It should be noted that the stylus is in alignment with the slit 16 so that the record on the paper 11 will register with the photo-density variations on the strip 15. When the strip has passed the slit 16, the paper having the strip attached is severed from the roll to provide a permanent record in the form of a line graph of the density variations.

While the present embodiment of the present invention has been illustrated and described herein as applied to testing of blood serum, it is not intended to limit the invention to such a disclosure, and changes and modifications may be incorporated and embodied therein within the scope of the following claims.

We claim:

1. In a recording densitometer for a test strip having variable translucency along its length, a casing, a single drive means for advancing a recording sheet and said test strip concurrently at corresponding rates in predetermined paths on said casing, a stylus for marking the recording sheet, means mounting said stylus for movement in a direction transversely of the path of travel of said recording sheet and in engagement therewith, means defining an opening in said casing underlying the path of travel of said test strip, a light source confronting said opening at one side of the path of travel of said test strip, light-sensitive means confronting said opening at the opposite side of the path of travel of said test strip and energizable by said light source in response to the intensity of light passing through said test strip, indicating means mounted on said casing and having a member movable in response to the energization of said light-sensitive means to a position indicative of the degree of translucency of said test strip, a second member actuatable to positions corresponding to the positions of said first member, and means interconnecting said second member and said stylus to cause the latter to move transversely of the recording sheet in proportions corresponding to each movement of the second member, thereby to provide on said recording sheet a line graph representative of the translucency of said test strip.

2. In a recording densitometer for a test strip having variable translucency along its length, a casing, a single drive means for advancing a recording sheet and said test strip concurrently at corresponding rates in predetermined paths on said casing, a stylus for marking the recording sheet, means mounting said stylus for movement in a direction transversely of the path of travel of said recording sheet and in engagement therewith, means defining an opening in said casing underlying the path of travel of said test strip, a light source confronting said opening at one side of the path of travel of said test strip, light-sensitive means confronting said opening at the opposite side of the path of travel of said test strip and energizable by said light source in response to the intensity of light passing through said test strip, indicating means mounted on said casing and having a member movable in response to the energization of said light-sensitive means to a position indicative of the degree of translucency of said test strip, a second member actuatable to positions corresponding to the positions of said first member, cable means interconnecting said second member and said stylus to cause the latter to move transversely of the recording sheet in proportions corresponding to each movement of the second member, thereby to provide on said recording sheet a line graph representative of the translucency of said test strip, and a linkage for actuating said second member comprising a Y-shaped member having its tail portion operatively connected to said cable means to actuate the same, a pair of cooperating links, each pivoted to the casing at one end and pivoted to a respective leg portion of the member at the opposite end, whereby substantially linear movement of said tail portion is effected upon pivotal movement of said links.

3. In a recording densitometer for a test strip having variable translucency along its length, a casing, an advancing roll for advancing a recording sheet and said test strip concurrently at corresponding rates in predetermined paths on said casing, a stylus for marking the recording sheet, a rod slidably mounting said stylus for movement in a direction transversely of the path of travel of said recording sheet and in engagement therewith, means defining an opening in said casing underlying the path of travel of said test strip, a light source confronting said opening at one side of the path of travel of said test strip, a photo-electric cell confronting said opening at the opposite side of the path of travel of said test strip and energizable by said light source in response to the intensity of light passing through said test strip, a meter mounted on said casing and having a needle movable angularly in response to the energization of said light sensitive means to a position indicative of the degree of translucency of said test strip, a follower pointer mounted on said meter and actuatable to angular positions overlying the positions of said needle and a continuous cable geared to said pointer and interconnecting the latter and said stylus to cause the stylus to move transversely of the recording sheet in proportions corresponding to each movement of the pointer, thereby to provide on said recording sheet a line graph representative of the translucency of said test strip.

References Cited in the file of this patent

UNITED STATES PATENTS 2,163,467    Philipsen _____ June 20, 1939

FOREIGN PATENTS 534,181    Germany _____ Sept. 23, 1931
60,982    Norway _____ June 5, 1937